US012614798B2

(12) United States Patent
Gu et al.

(10) Patent No.: US 12,614,798 B2
(45) Date of Patent: Apr. 28, 2026

(54) BATTERY PACK INCLUDING FOAM KIT ASSEMBLY, AND MANUFACTURING METHOD THEREFOR

(71) Applicant: LG ENERGY SOLUTION, LTD., Seoul (KR)

(72) Inventors: Ja Eon Gu, Daejeon (KR); Jae Uk Ryu, Daejeon (KR); Jin Hak Kong, Daejeon (KR); Min Ho Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 612 days.

(21) Appl. No.: 18/030,161

(22) PCT Filed: Oct. 13, 2021

(86) PCT No.: PCT/KR2021/014080
§ 371 (c)(1),
(2) Date: Apr. 4, 2023

(87) PCT Pub. No.: WO2022/080845
PCT Pub. Date: Apr. 21, 2022

(65) Prior Publication Data
US 2023/0378582 A1     Nov. 23, 2023

(30) Foreign Application Priority Data
Oct. 14, 2020     (KR) ........................ 10-2020-0133011

(51) Int. Cl.
*H01M 50/24*          (2021.01)
*H01M 10/658*        (2014.01)
(Continued)

(52) U.S. Cl.
CPC ......... *H01M 50/24* (2021.01); *H01M 10/658* (2015.04); *H01M 50/213* (2021.01);
(Continued)

(58) Field of Classification Search
CPC ... Y02E 60/10; H01M 10/658; H01M 50/213; H01M 50/24; H01M 50/244; H01M 50/271; H01M 50/609
See application file for complete search history.

(56) References Cited

U.S. PATENT DOCUMENTS 3,269,865 A     8/1966   Swanson
3,919,371 A     11/1975  Jache
(Continued)

FOREIGN PATENT DOCUMENTS

CN     103561822 A     2/2014
JP     S59-128774 A    7/1984
(Continued)

OTHER PUBLICATIONS

Office Action issued Mar. 4, 2024 for Japanese Patent Application No. 2023-514128 (Note: JP 2010-519712 A was cited in a prior IDS.).
(Continued)

*Primary Examiner* — Lingwen R Zeng
(74) *Attorney, Agent, or Firm* — Morgan, Lewis & Bockius LLP

(57)          ABSTRACT

A battery pack may include a battery pack case having an inner space, a plurality of battery cells accommodated in the inner space of the battery pack case, arranged in a horizontal direction, and each extending in a vertical direction, a foam kit assembly accommodated in the inner space of the battery pack case so that the foam kit assembly is disposed on the plurality of battery cells and isolated from the outside, and foam discharged from the foam kit assembly and filled between an inner surface of the battery pack case and the foam kit assembly. A method of manufacturing a battery pack is also provided. The foam kit assembly may fill the foam uniformly in the battery pack case.

18 Claims, 4 Drawing Sheets

(51) Int. Cl.
    *H01M 50/213*     (2021.01)
    *H01M 50/244*     (2021.01)
    *H01M 50/271*     (2021.01)
    *H01M 50/609*     (2021.01)

(52) U.S. Cl.
    CPC ........ *H01M 50/244* (2021.01); *H01M 50/271*
    (2021.01); *H01M 50/609* (2021.01); *Y02E*
    *60/10* (2013.01)

(56)          References Cited

U.S. PATENT DOCUMENTS

| | | | |
|---|---|---|---|
| 2011/0159339 | A1 | 6/2011 | Gregor et al. |
| 2012/0003508 | A1* | 1/2012 | Narbonne ............. H01M 50/24 |
| | | | 429/8 |
| 2014/0170447 | A1 | 6/2014 | Woehrle et al. |
| 2018/0212222 | A1 | 7/2018 | Barton et al. |
| 2018/0223070 | A1 | 8/2018 | O'neil et al. |
| 2022/0021046 | A1 | 1/2022 | Shi et al. |

FOREIGN PATENT DOCUMENTS

| | | | |
|---|---|---|---|
| JP | 2902280 | B2 | 6/1999 |
| JP | 2000-243364 | A | 9/2000 |
| JP | 2010519712 | A | 6/2010 |
| JP | 5760713 | B2 | 8/2015 |
| JP | 6242799 | B2 | 12/2017 |
| JP | 2020-507194 | A | 3/2020 |
| KR | 10-0897899 | B1 | 5/2009 |
| KR | 10-2018-0112630 | A | 10/2018 |
| KR | 10-2018-0124439 | A | 11/2018 |
| KR | 10-2019-0092835 | A | 8/2019 |
| KR | 10-2019-0097231 | A | 8/2019 |
| KR | 10-2020-0084450 | A | 7/2020 |
| WO | 2020/028168 | A1 | 2/2020 |

OTHER PUBLICATIONS

Extended European Search Report issued Feb. 16, 2024 for European Patent Application No. 21880492.0 (Note: CN 103561822 A was cited in a prior IDS.).
International Search Report (with partial translation) dated Jan. 17, 2022, issued in corresponding International Patent Application No. PCT/KR2021/014080.

* cited by examiner

100 : 110, 120
310 : 311, 312, 313
300 : 310, 320, 330

BATTERY PACK INCLUDING FOAM KIT ASSEMBLY, AND MANUFACTURING METHOD THEREFOR

TECHNICAL FIELD

The present disclosure relate to a battery pack including a foam kit assembly and a manufacturing method thereof, and more particularly, to a battery pack including a foam kit assembly, which is capable of filling foam uniformly in a battery pack case, and a manufacturing method thereof.

BACKGROUND

A secondary battery, as a rechargeable battery, is used in various fields from a smartphone to an electric vehicle. Here, the secondary battery is used in the form of one battery cell or in the form of a battery pack in which a plurality of battery cells are connected according to the kinds of devices using the secondary battery. For example, the secondary battery used in a small-sized device such as a smartphone is used in the form of one battery cell. Also, the secondary battery used in a medium and large-sized device such as an electric vehicle is used in the form of the battery pack in which the plurality of battery cells are connected.

When the plurality of battery cells constitute the battery pack used for the medium and large-sized device, large number of battery cells is necessary to satisfy an output voltage and a charging capacity required in the medium and large-sized device. The battery cells are concentrated in a small space, and foam is filled therebetween.

The foam performs many functions of blocking heat transfer between the plurality of battery cells, inducing a material leaked from a broken battery cell away from another battery cell, and preventing a short-circuit between the plurality of battery cells.

The foam is injected into a battery pack housing through a plurality of ports defined in a sidewall of the battery pack housing. Since a gap between the plurality of battery cells is narrow to increase an energy density of the battery pack, filling the foam uniformly between the plurality of battery cells narrowly arranged in the battery pack housing is difficult. Also, since the foam used in the battery pack generally has a high viscosity, injecting the foam deeply into a central portion of the battery pack housing from the outside of the battery pack housing is difficult, and securing distribution uniformity of the foam in a height direction of the battery cell is difficult although the foam is deeply injected.

The background technology of the present invention is disclosed in patent documents below.

(Patent document 1) KR10-2019-0097231 A
(Patent document 2) KR10-0897899 B1

SUMMARY

The present disclosure provides a battery pack including a foam kit assembly capable of uniformly filling foam in a battery pack case and a manufacturing method thereof.

In accordance with an exemplary embodiment, a battery pack includes: a battery pack case having an inner space; a plurality of battery cells accommodated in the inner space of the battery pack case, arranged in a horizontal direction, and each extending in a vertical direction; a foam kit assembly accommodated in the inner space of the battery pack case so that the foam kit assembly is disposed on the plurality of battery cells and isolated from the outside; and foam discharged from the foam kit assembly and filled between an inner surface of the battery pack case and the foam kit assembly. Here, the foam kit assembly includes: a support frame extending in the horizontal direction and having at least one opening so that liquid foam passes therethrough in the vertical direction; a foam kit seated on the support frame to contact a top cover of the battery pack case and be pressed by the top cover and having an accommodation space formed therein for accommodating the liquid foam; and a pressing needle protruding from the support frame to penetrate the foam kit. Also, the foam is formed such that the liquid foam flows downward from the accommodation space of the foam kit through a through-hole of the foam kit, which is defined by the pressing needle, to form the foam on a bottom surface of a housing of the battery pack case.

The foam kit may have a top surface brought into contact with the top cover and pressed downward by the top cover and a bottom surface through which the pressing needle is penetrated.

The battery pack case may include: the housing of which the inside is opened upward; and the top cover mounted to an upper opening of the housing so as to press the foam kit of the foam kit assembly downward.

The foam may be solidified by foaming and curing of the liquid foam and uniformly fill a gap between the plurality of battery cells in the vertical direction while surrounding the plurality of battery cells.

The support frame may support an upper shape of the foam discharged from the through-hole of the foam kit and formed between the plurality of battery cells. Here, the support frame may include: an edge member extending along an inner circumference of the upper opening of the housing; and a bar member which is disposed inside the edge member so that the foam kit is seated thereon and extends in the horizontal direction to be supported by the edge member and in which the at least one opening is formed in a grid shape.

The pressing needle may protrude upward from a plurality of positions of a top surface of the bar member, the bottom surface of the foam kit may be penetrated by the pressing needle, and a gap through which the liquid foam flows downward may be formed between a penetrated portion of the foam kit and an outer circumferential surface of the pressing needle.

The plurality of battery cells may be divided into a plurality of groups based on position in the horizontal direction, and the pressing needle may be provided in plurality so that a plurality of pressing needles are aligned to a central position of each of the plurality of groups in the vertical direction and spaced apart from each other in the horizontal direction.

The foam kit may include: a pouch-type vinyl cover; and at least one storage chamber formed in the pouch-type vinyl cover to accommodate the liquid foam, and the liquid foam may be one component type liquid foam.

The foam kit may include: a pouch-type vinyl cover; a plurality of storage chambers formed in the pouch-type vinyl cover to accommodate the liquid foam; and a separation membrane disposed in the pouch-type vinyl cover to partition the pouch-type vinyl cover into the plurality of storage chambers and broken by a pressure applied to the pouch-type vinyl cover from the top cover. Here, the liquid foam may be two component type liquid foam, and a base and a curing agent of the two component type liquid foam may be accommodated in the plurality of storage chambers, respectively.

The pouch-type vinyl cover may be melted at a temperature of heat generated when the liquid foam is foamed and cured.

In accordance with another exemplary embodiment, a method for manufacturing a battery pack includes: a battery cell storing process of storing a plurality of battery cells arranged in a horizontal direction and each extending in a vertical direction in a housing of which the inside is opened upward; a foam kit assembly arrangement process of arranging a foam kit assembly, in which liquid foam is accommodated, on the plurality of battery cells; a battery pack case assembly process of assembling a battery pack case by mounting a top cover to an upper opening of the housing; a liquid foam diffusion process of allowing a portion of the foam kit assembly to be penetrated as the foam kit assembly contacts the top cover and is pressed by the top cover and diffusing the liquid foam to an entire inner space of the battery pack case from the foam kit assembly; and a foam formation process of forming foam between an inner surface of the battery pack case and the foam kit assembly by foaming and curing the liquid foam.

The foam kit assembly arrangement process may include: a support frame seat process of seating a support frame of the foam kit assembly on the plurality of battery cells; a foam kit seat process of seating a foam kit of the foam kit assembly on the support frame; and a pressing needle contact process of allowing the foam kit and a pressing needle of the foam kit assembly, which protrudes from the support frame, to contact each other.

The liquid foam diffusion process may include: a foam kit pressing process of pressing the foam kit downward by the top cover; a discharge hole forming process of forming a discharge hole by penetrating the pressing needle through a bottom surface of the foam kit; and a liquid foam discharge process of discharging the liquid foam accommodated in the foam kit onto the plurality of battery cells through a gap between the discharge hole and an outer circumferential surface of the pressing needle.

The liquid foam diffusion process may include: a liquid foam spreading process of spreading the liquid foam on the plurality of battery cells in the horizontal direction; and a liquid foam flowing process of inducing a downward flow of the liquid foam from an upper portion to a lower portion of each of the plurality of battery cells.

The foam formation process may include: a liquid foam solidification process of solidifying the liquid foam by foaming and curing the liquid foam; and a foam kit exterior melting process of melting a pouch-type vinyl cover that is an exterior of the foam kit by using heat generated when the liquid foam is foamed and cured.

The battery cell may be a cylindrical secondary battery, and foam formed through the foam formation process uniformly may fill a gap between the plurality of battery cells in the vertical direction.

In accordance with the exemplary embodiment, when the battery pack is manufactured, the foam kit assembly may be seated in the battery pack case, and then battery pack case may be assembled to simultaneously fill the foam uniformly in the battery pack case by using the foam kit assembly. Thus, the uniformity of the foam in the battery pack case may be secured, and the time required for manufacturing the battery pack may be reduced.

DETAILED DESCRIPTION OF EMBODIMENTS

Figure 1:
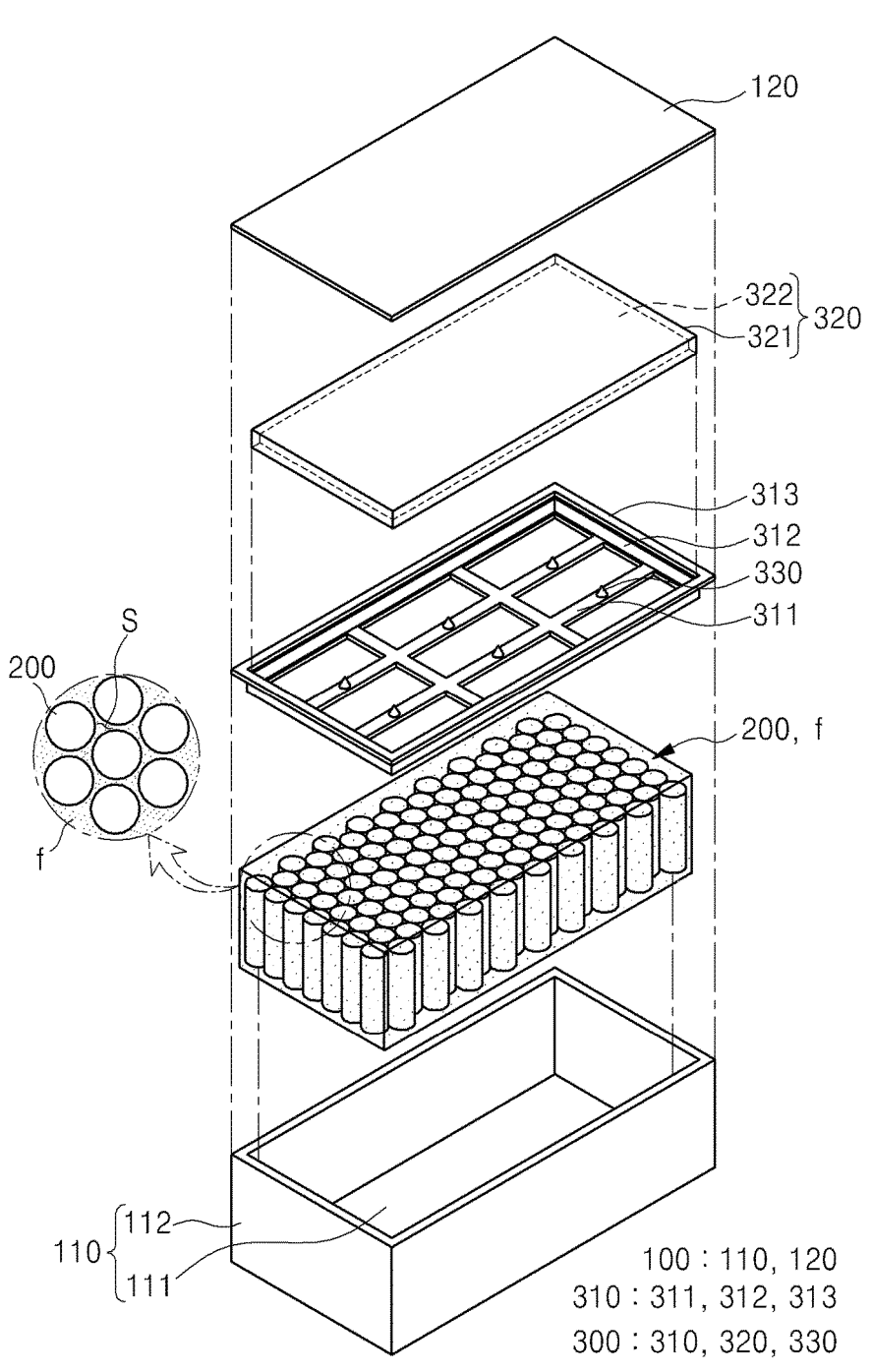
FIG. 1 is an exploded perspective view illustrating a foam kit assembly and a battery pack including the same in accordance with an exemplary embodiment.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Hereinafter, embodiments of the inventive concept will be described with reference to the accompanying drawings.

Figure 2:
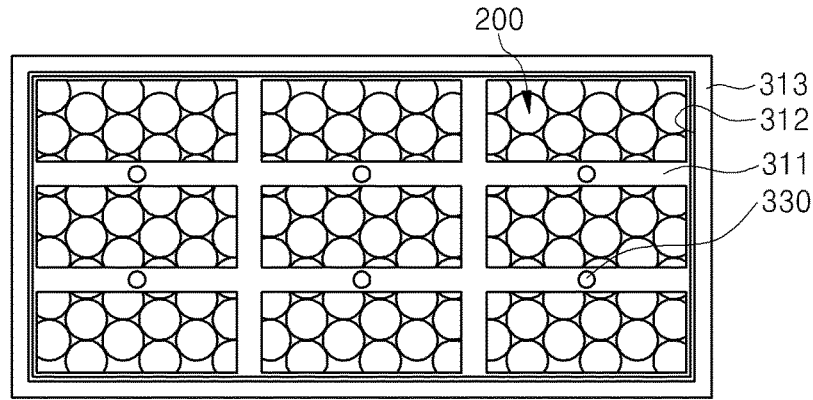
FIG. 2 is a plan view illustrating a support frame and a pressing needle in accordance with an exemplary embodiment.
Figure 3:
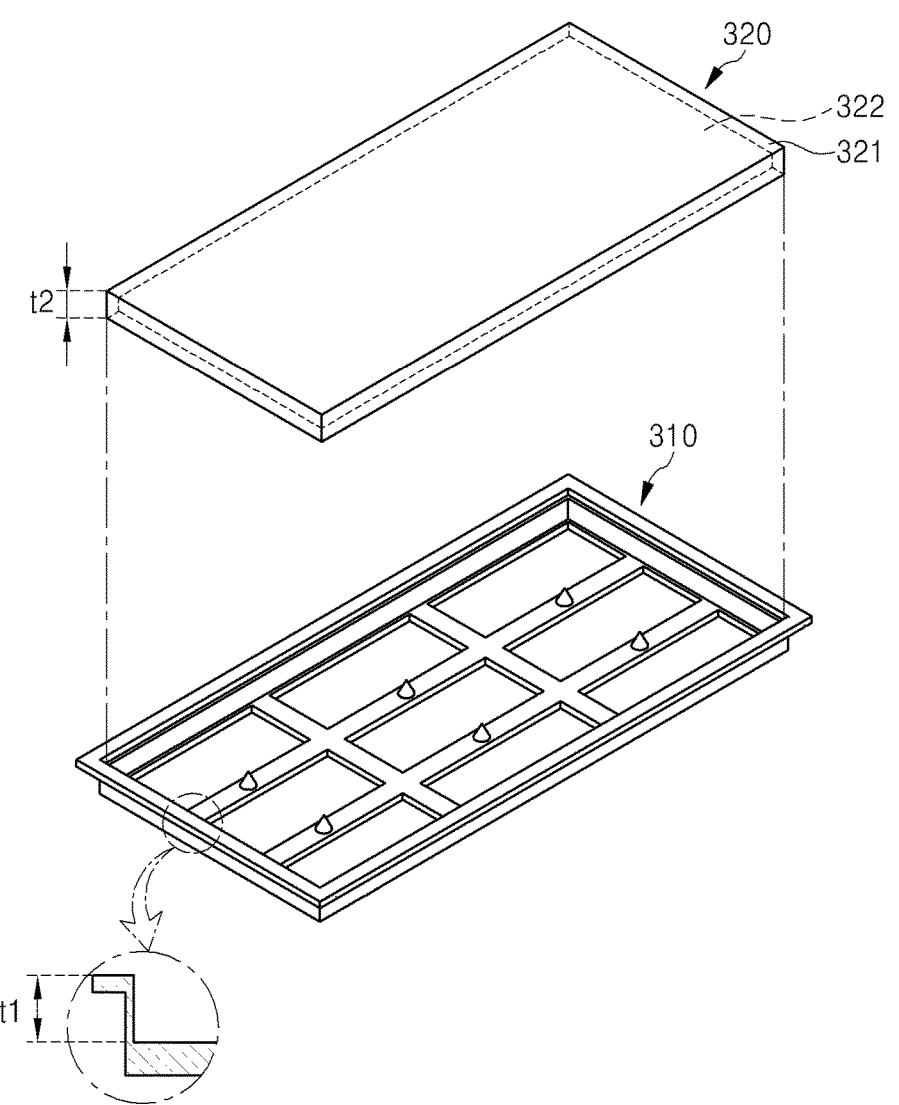
FIG. 3 is an exploded perspective view illustrating the foam kit assembly in accordance with an exemplary embodiment.

1. Battery Pack Including Foam Kit Assembly in Accordance with Exemplary Embodiment FIG. 1 is an exploded perspective view illustrating a foam kit assembly and a battery pack including the same in accordance with an exemplary embodiment. FIG. 2 is a plan view illustrating a support frame and a pressing needle. FIG. 3 is an exploded perspective view illustrating the foam kit assembly in accordance with an exemplary embodiment.

The battery pack including the foam kit assembly in accordance with an exemplary embodiment will be described with reference to FIGS. 1 to 3.

The battery pack in accordance with an exemplary embodiment may include a battery pack case 100, a plurality of battery cells 200, a foam kit assembly 300, and foam f.

1.1. Battery Pack Case 100

The battery pack case 100 may have an inner space to accommodate the plurality of battery cells 200 therein. The battery pack case 100 may have a rectangular cylinder shape. Alternatively, the battery pack case 100 may have various shapes. The plurality of battery cells 200, the foam kit assembly 300, and the foam f may be accommodated in the battery pack case 100. Here, the plurality of battery cells 200 may be disposed below the foam kit assembly 300. Also, the foam f may surround a whole of the plurality of battery cells 200 and simultaneously surround each of the plurality of battery cells 200. Specifically, the foam f may fill a space between the plurality of battery cells 200 and an inner surface of the battery pack case 100 and simultaneously fill a gap S between the plurality of battery cells 200.

The battery pack case 100 may include a housing 110 of which the inside is opened upward and a top cover 120 mounted to the upper opening of the housing to press the foam kit assembly 300 in a downward direction.

The housing 110 may include a lower plate 111 having a plate shape having a predetermined area so that the plurality of battery cells 200 are seated thereon and an upper frame 112 having a rectangular cylinder shape extending along a circumference of the lower plate 111 and having a predetermined height greater than that of, e.g., the plurality of battery cells 200.

The top cover 120 may extend in a horizontal direction and have a predetermined area to be seated on an upper end of the upper frame 112.

1.2. The Plurality of Battery Cells 200

The plurality of battery cells 200 may be accommodated in the inner space of the battery pack case 100 and arranged in the horizontal direction. Each of the plurality of battery cells 200 may be a cylindrical secondary battery cell extending in a vertical direction.

The secondary battery cell may be formed such that an electrode assembly in which as a separation membrane is disposed between a positive electrode plate with a positive electrode tab attached and a negative electrode plate with a negative electrode tab attached, the positive electrode plate, the negative electrode plate, and the separation membrane are wound in the form of jelly roll is accommodated in the cell case. An electrode terminal may be formed at each of one side and the other side, which is opposite to the one side, of the secondary battery cell. Here, when a positive electrode terminal is formed at the one side of the secondary battery cell, a negative electrode terminal may be formed at the other side opposite to the one side.

For example, as the plurality of battery cells 200 are arranged in a row direction and a column direction such that battery cells arranged in the row direction are arranged so that a positive electrode terminal and a negative electrode terminal are alternately arranged upward, and battery cells arranged in the column direction are arranged so that the same electrode terminal are arranged upward, the plurality of battery cells 200 may be accommodated in the inner space of the battery pack case 100. Also, the plurality of battery cells 200 may be serial-connected in the row direction and parallel-connected in the column direction by a bus bar (not shown). However, the plurality of battery cells 200 may have various arrangement structures and various connection methods. Here, the row direction may be a left-right direction, and the column direction may be a front and rear direction. All of the left-right direction and the front and rear direction may be referred to as a horizontal direction. Also, a direction crossing the horizontal direction may be referred to as a vertical direction.

1.3. Foam Kit Assembly 300

The foam kit assembly 300 is accommodated in the inner space of the battery pack case 100 to be disposed on the plurality of battery cells 200 and isolated from the outside. Also, as the foam kit assembly 300 is pressed by a contact with the battery pack case 100, a portion of the foam kit assembly 300 may be penetrated. Here, the penetrated portion of the foam kit assembly 300 may be used as a passage through which liquid foam is discharged when the battery pack is manufactured. That is, the foam kit assembly 300 serves to supply the liquid foam to the inner space of the battery pack case 100.

1.4. Detail Configuration of Foam Kit Assembly 300

The foam kit assembly 300 may include a support frame 310, a foam kit 320, and a pressing needle 330.

1.4.1. Support Frame 310

The support frame 310 may be disposed on the plurality of battery cells 200. The support frame 310 may extend in the horizontal direction. The support frame 310 may allow the foam kit 320 to be seated on a top surface thereof. The support frame 310 may have at least one opening so that the foam passes therethrough.

The support frame 310 may include a bar member 311 in which the at least one opening is formed in a grid shape, an edge member 312 for supporting an edge of the frame member 311, and a hanging member 313 allowing the edge member 312 to be seated on the upper end of the upper frame 112 of the housing 110.

The bar member 311 may have a predetermined area so that the foam kit 320 is seated thereon. The bar member 311 may be disposed inside the edge member 312, extend in the horizontal direction, and supported by a lower portion of the edge member 312. Also, at least one opening may be formed with the grid shape in the bar member 311. For example, the bar member 311 may include a plurality of first bars extending in the left-right direction and a plurality of second bars extending in the front-rear direction. Here, the plurality of first bars and the plurality of second bars may be arranged in the grid shape and connected to each other.

The edge member 312 may extend along an inner circumferential of an upper opening of the housing 110. The edge member 312 may have, e.g., a rectangular frame shape. The edge member 312 may be inserted into the upper opening of the housing 110 and contact an inner surface of the upper opening of the housing 110.

The hanging member 313 may be formed as an upper end of the edge member 312 is bent to the outside. That is, the hanging member 313 may have a rectangular ring shape. The hanging member 313 may have a bottom surface seated on the upper end of the upper frame 112. The top cover 120 may be seated on a top surface of the hanging member 313.

Alternatively, the hanging member 313 may be inserted into the upper opening of the housing 110. In this case, the edge member 312 may be spaced apart from the inner surface of the upper opening of the housing 110 in the upper opening of the housing 110, and the top cover 120 may be seated on the upper end of the upper frame 112 of the housing 110.

1.4.2. Foam Kit 320

The foam kit 320 may be seated on the support frame 310 so as to contact the top cover 120 and be pressed downward and have an accommodation space formed therein for accommodating the liquid foam. That is, the foam kit 320 temporarily stores the liquid foam therein and injects the liquid foam therein into the inner space of the battery pack case 100 when the battery pack is manufactured.

The foam kit 320 may have a vertical thickness t2 greater than a vertical thickness t1 of the edge member 312. Thus, when the top cover 120 is assembled to the upper opening of the housing 110, the foam kit 320 may contact a bottom surface of the top cover 120 and be pressed downward.

Alternatively, the foam kit 320 may have the vertical thickness t2 equal to the vertical thickness t1 of the edge member 312. In this case, the foam kit 320 may be seated on the pressing needle 330 to protrude by a predetermined height upward from the edge member 312, and the foam kit 320 may contact the bottom surface of the top cover 120 and be pressed downward when the top cover 120 is assembled to the upper opening of the housing 110.

When the vertical thickness t2 of the foam kit 320 is less than the vertical thickness t1 of the edge member 312, a protruding height of the pressing needle 330 may be determined so that the foam kit 320 protrudes by a predetermined height upward from the edge member 312 when the foam kit 320 is seated on the pressing needle 330.

By using the foam kit 320, the battery pack case 100 may not include a port for injecting the liquid foam and may have a simplified structure in an exemplary embodiment. Also, by using the foam kit 320, a manufacturing process of the battery pack may be simplified because the liquid foam moves in the battery pack case 100 in an exemplary embodiment, and a battery pack manufacturing facility may be simplified because a device for forcedly injecting the liquid foam into the battery pack case 100 from the outside is not used.

The foam kit 320 may include a pouch-type vinyl cover 321 and at least one storage chamber 322 formed in the pouch-type vinyl cover 321 to accommodate the liquid foam.

The liquid foam may be one component type liquid foam and include various materials foamed and cured when contacting air. The liquid foam may maintain a liquid state as contact with air is blocked by the pouch-type vinyl cover 321 when accommodated in the storage chamber 322. The liquid foam may be foamed and cured as the liquid foam is leaked to the inner space of the battery pack case 100 when the pouch-type vinyl cover 321 is broken. Here, predetermined heat may be generated.

The pouch-type vinyl cover 321 may be disposed on the bar member 311. The pouch-type vinyl cover 321 temporarily stores the liquid foam therein and discharges the liquid foam therein to the inner space of the battery pack case 100 when a portion thereof is broken by the pressing needle 330. The pouch-type vinyl cover 321 may have a predetermined thickness and include a predetermined material that is melted at a temperature generated when the liquid foam is foamed and cured. Thus, when the foam f is formed as the liquid foam is completely foamed and cured, at least a portion of the pouch-type vinyl cover 321 may be melted and removed by heat.

1.4.3. Pressing Needle 330

The pressing needle 330 protrudes from the support frame 310 to penetrate the foam kit 320. Specifically, the pressing needle 330 may protrude upward from a plurality of positions of a top surface of the bar member 331, and thus, a bottom surface of the foam kit 320 may be penetrated by the pressing needle 330 when the battery pack case 100 is assembled. The pressing needle 330 may have a cone shape. Alternatively, the pressing needle 330 may have various shapes.

Here, a gap allowing the liquid foam to flow therethrough may be formed between an outer circumferential surface of the pressing needle 330 and a penetrated portion of the foam kit 320, and the liquid foam in the foam kit 320 may flow downward through the gap.

The plurality of battery cells 200 may be divided into a plurality of groups according to positions in the horizontal direction. Also, the pressing needle 330 may be provided in plurality to be aligned to a central position of each of the plurality of groups in the vertical direction, and the plurality of pressing needles 330 may be spaced apart from each other. Thus, the above-described gaps allowing the liquid foam to flow therethrough may be uniformly spaced apart from each other in the horizontal direction and supply the liquid foam onto the plurality of battery cells 200 when the battery pack is manufactured.

1.5. Foam f

The foam f is discharged from the foam kit assembly 300 and filled between the inner surface of the battery pack case 100 and the foam kit assembly 300. Here, the foam f may be discharged downward from the penetrated portion, which is caused by the pressing needle 330, of the foam kit 320 and fill the gap S between the plurality of battery cells 200 in the vertical direction. That is, the foam f is discharged from the penetrated portion, formed in a solid state as the liquid foam is foamed and cured, and surrounds each of the plurality of battery cells 200.

1.6. Foam Kit in Accordance with a Modified Example of an Exemplary Embodiment

Figure 4:
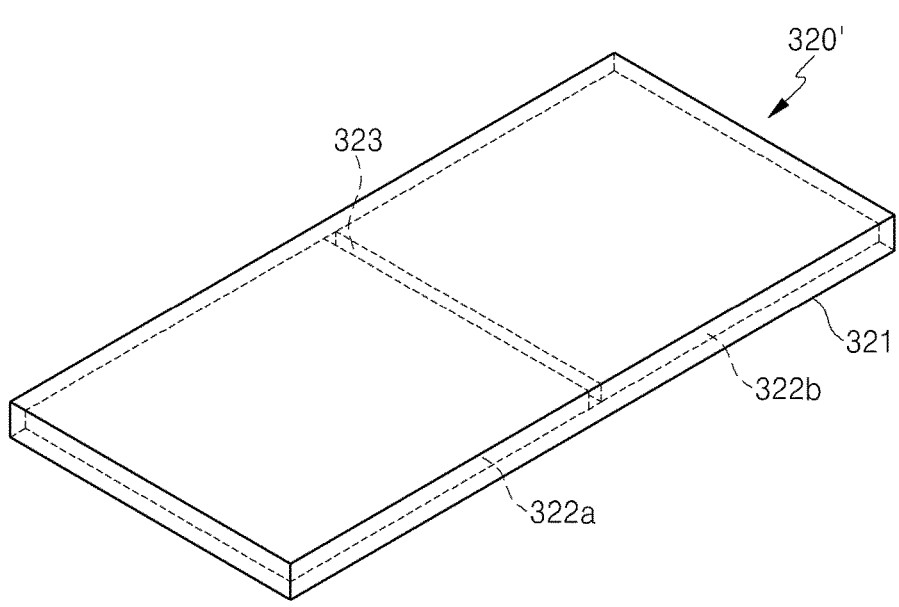
FIG. 4 is a schematic view illustrating a foam kit in accordance with a modified example of an exemplary embodiment.

FIG. 4 is a schematic view illustrating a foam kit in accordance with a modified example of an exemplary embodiment.

Referring to FIG. 4, a foam kit 320' in accordance with a modified example of an exemplary embodiment includes a pouch-type vinyl cover 321, a plurality of storage chambers 322a and 322b formed in the pouch-type vinyl cover 321 to accommodate liquid foam, and a separation membrane 323 disposed in the pouch-type vinyl cover 321 to partition the plurality of storage chambers 322a and 322b and broken by a pressure applied from a top cover 120 to the pouch-type vinyl cover 321.

Here, the liquid foam may be two component type liquid foam. That is, the liquid foam may include a base and a curing agent. In this case, the base and the curing agent are separated and then mixed when the foam f is formed. Thus, the pouch-type vinyl cover 321 may include the plurality of storage chambers 322a and 322b, the base and the curing agent of the two component type liquid foam may be respectively accommodated in the plurality of storage chambers, and then the base and the curing agent may be mixed with each other when the separation membrane 323 is broken. Also, the separation membrane 323 may have a predetermined thickness to be more easily broken than the pouch-type vinyl cover 321, and the separation membrane 323 may be broken before a pressing needle 330 penetrates the pouch-type vinyl cover 321 when the pouch-type vinyl cover 321 is pressed by the top cover 120.

1.7. Battery Pack Case in Accordance with Another Modified Example of an Exemplary Embodiment As the foam kit 320 is penetrated by the pressing needle 330, the liquid foam flows downward through the gap therebetween. Here, the liquid foam flows from an upper portion to a lower portion of the battery cell. Here, air existing around the lower portion of the battery cell may be isolated at a lower portion of the battery pack case 100 by the liquid foam instead of being discharged to an upper side of the liquid foam. Also, when the liquid foam is solidified while being foamed and cured, a predetermined gas may be discharged, and the discharged gas may be isolated at the lower portion of the battery pack case 100.

A housing 110 of a battery pack case in accordance with another modified example of an exemplary embodiment may include a predetermined pneumatic pressure adjustment hole (not shown) so that the air and the gas smoothly moves to an upper portion of the battery pack case 100.

Specifically, the housing 110 may include a lower plate 111 having an area so that the plurality of battery cells 200 are seated thereon and an upper frame 112 extending along a circumference of the lower plate 111 and having a height greater than that of each of a plurality of battery cells 200. Here, the pneumatic pressure adjustment hole may extend in the inside of the lower plate 111 and the inside of the upper frame 112 and have an inlet formed in a top surface of the lower plate 111 and an outlet formed in an inner circumferential surface or an outer circumferential surface of an upper end of the upper frame 112. At least one pneumatic pressure adjustment hole may be formed.

The pneumatic pressure adjustment hole may prevent the air or the gas from being isolated at the lower portion of the battery pack case 100, and thus, the liquid foam may smoothly flow until the top surface of the lower plate 111.

Figure 5:
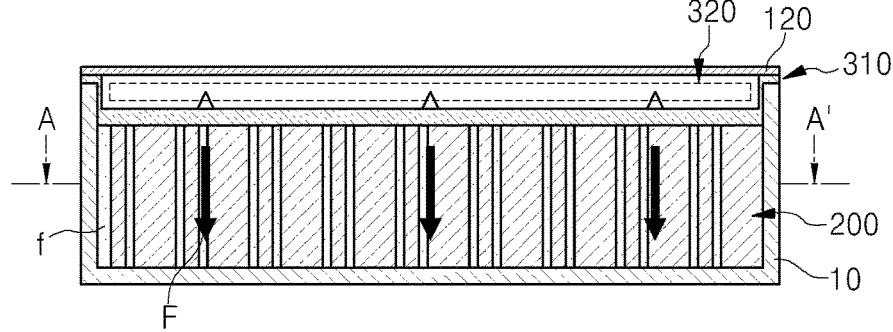
FIG. 5 is a view for explaining a liquid foam diffusion process and a foam formation process of a method for manufacturing a battery pack including a foam kit assembly in accordance with an exemplary embodiment.
Figure 6:
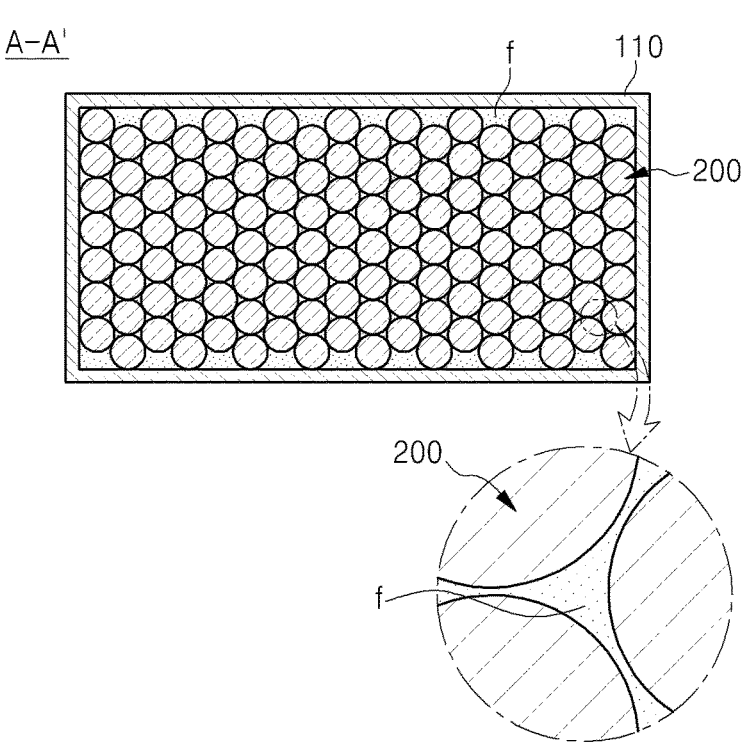
FIG. 6 is a view for explaining the foam formation process in accordance with an exemplary embodiment.

2. Method for Manufacturing Battery Pack Including Foam Kit Assembly in Accordance with an Exemplary Embodiment FIG. 5 is a view for explaining a liquid foam diffusion process and a foam formation process of a method for manufacturing a battery pack including a foam kit assembly in accordance with an exemplary embodiment. FIG. 6 is a view for explaining the foam formation process in accordance with an exemplary embodiment.

The method for manufacturing the battery pack including the foam kit assembly in accordance with an exemplary embodiment will be described with reference to FIGS. 1 to 6. Here, when the method for manufacturing the battery pack including the foam kit assembly is described, features overlapped with the above description of the battery pack including the foam kit assembly in accordance with an exemplary embodiment will be omitted or simply described.

The method for manufacturing the battery pack including the foam kit assembly in accordance with an exemplary embodiment may include following processes.

2.1. Battery Cell Storing Process

A battery cell storing process performs a process of storing a plurality of battery cells 200 arranged in the horizontal direction in a housing 110 of which the inside is opened upward and each extending in the vertical direction. Each of the plurality of battery cells 200 may be a cylindrical secondary battery. The plurality of battery cells 200 may be electrically connected to each other by a bus bar (not shown). The plurality of battery cells 200 may be spaced a predetermined distance from each other to form a gap S therebetween.

2.2. Foam Kit Assembly Arrangement Process

A foam kit assembly arrangement process performs a process of arranging a foam kit assembly 300, in which liquid foam is stored, on the plurality of battery cells 200.

The foam kit assembly arrangement process may include: a support frame seat process of seating a support frame 310 of the foam kit assembly 300 on the plurality of battery cells 200; a foam kit seat process of seating a foam kit 320 of the foam kit assembly 300 on the support frame 310; and a pressing needle contact process of allowing the foam kit 320 and a pressing needle 330 of the foam kit assembly 300, which protrudes from the support frame 310, to contact each other. In this process, since the foam kit 320 is not pressed by a top cover, the foam kit 320 may be seated on the pressing needle 330.

2.3. Battery Pack Case Assembly Process

A battery pack case assembly process performs a process of assembling a battery pack case by mounting the top cover 120 to an upper opening of the housing 110.

For example, the top cover 120 may be seated and mounted onto a top surface of a hanging member 313 in a structure in which the hanging member 313 of the support frame 310 is seated on a circumference of the upper opening of the housing. The top cover 120 may be seated and mounted onto an upper end of the upper frame 112 of the housing 110 in a structure in which the hanging member 313 of the support frame 310 is inserted into the upper opening of the housing. While the battery pack case assembly process is performed, the liquid foam diffusion process may be performed together. That is, the liquid foam diffusion process may be quickly performed by assembling the battery pack case 100 in an exemplary embodiment, and thus an entire manufacturing process of the battery pack may be reduced.

2.4. Liquid Foam Diffusion Process

A liquid foam diffusion process performs a process of diffusing the liquid foam to the entire inner space of the battery pack case 100 from the inside of the foam kit 320 of the foam kit assembly 300 such that the foam kit 320 of the foam kit assembly 300 contacts the bottom surface of the top cover 120 to press the foam kit 320, and a portion of the foam kit 320 of the foam kit assembly 300 is penetrated by the pressing needle 330.

The liquid foam diffusion process may include: a foam kit pressing process of pressing the foam kit 320 downward by the top cover 120; a discharge hole forming process of forming a discharge hole by penetrating the pressing needle 330 through a bottom surface of the foam kit 320; and a liquid foam discharge process of discharging the liquid foam accommodated in the foam kit 320 onto the plurality of battery cells 200 through a gap between the discharge hole and an outer circumferential surface of the pressing needle 330.

That is, while assembling the battery pack case 100 by mounting the top cover 120 to the housing 110, the pressing needle 330 may penetrate the bottom surface of the foam kit 320 by pressing the foam kit 320 by the top cover 120. Thus, a plurality of through-holes, e.g., discharge holes, may be formed in the bottom surface of the foam kit 320, and the liquid foam that is temporarily stored in the foam kit 320 may be smoothly discharged downward through the gap between the pressing needle 330 and the through-hole.

Alternatively, the liquid foam diffusion process may include: a liquid foam spreading process of spreading the liquid foam on the plurality of battery cells 200 in the horizontal direction; and a liquid foam flowing process of inducing downward flow F of the liquid foam from an upper portion to a lower portion of each of the plurality of battery cells 200. That is, the liquid foam discharged onto the plurality of battery cells 200 through the through-hole may have a predetermined viscosity. The liquid foam may be uniformly spread on the plurality of battery cells 200 in the horizontal direction because the liquid foam flows in the horizontal direction in which the liquid foam more easily flows before the liquid foam flows downward to the gap between the plurality of battery cells 200. Here, at least one opening having a grid shape may be formed in the bar member 311. Thereafter, the liquid foam may flow downward form the upper portion to the lower portion of each of the plurality of battery cells 200 through the gap S between the plurality of battery cells 200. Here, the liquid foam may be uniformly filled to the gap S between the plurality of battery cells 200 in the vertical direction. A foam formation process may be performed while the liquid foam spreading process and the liquid foam flowing process are performed.

2.5. Foam Formation Process

A foam formation process may perform a process of forming a solidified foam f between an inner surface of the battery pack case 100 and the foam kit assembly 300 by foaming and curing the liquid foam in the inner space of the battery pack case 100.

That is, the foam formation process may include: a liquid foam solidification process of solidifying the liquid foam by foaming and curing the liquid foam; and a foam kit exterior melting process of melting the pouch-type vinyl cover 321 that is an exterior of the foam kit 320 by using heat generated when the liquid foam is foamed and cured, e.g., heat of about 40° C. The liquid foam may be foamed and cured by contacting air in the battery pack case 100 or foamed and cured by mixing a base and curing agent. When the pouch-type vinyl cover 321 of the foam kit 320 is melted by heat, the foam f may be formed even in a space occupied by the pouch-type vinyl cover 321. Alternatively, only a portion of the pouch-type vinyl cover 321 is melted and removed by heat, or a whole of the pouch-type vinyl cover 321 may be remained on the support frame 310.

The foam f formed through the foam formation process may uniformly fill the gap S between the plurality of battery cells 200 in the vertical direction, block heat transfer between the plurality of battery cells 200 after solidified, and induce a material leaked from a broken battery cell to flow away from another battery cell to prevent short-circuit between the plurality of battery cells 200.

Although the embodiments of the present invention have been described, it is understood that the present invention should not be limited to these embodiments but various changes and modifications can be made by one ordinary skilled in the art within the spirit and scope of the present invention as hereinafter claimed. Therefore, it will be readily understood by those skilled in the art that various modifications and changes can be made thereto without departing from the spirit and scope of the present invention defined by the appended claims.

REFERENCE SIGNS

100: battery pack case
110: housing
120: top cover
200: plurality of battery cells
300: foam kit assembly
310: support frame
311: bar member
312: edge member
313: hanging member
320: foam kit
321: pouch-type vinyl cover
322: storage chamber
330: pressing needle
S: gap
f: foam
F: downward flow of liquid foam

The invention claimed is:

1. A battery pack, comprising:
a battery pack case having an inner space;
a plurality of battery cells accommodated in the inner space of the battery pack case, arranged in a horizontal direction, and each extending in a vertical direction;
a foam kit assembly accommodated in the inner space of the battery pack case so that the foam kit assembly is disposed on the plurality of battery cells and isolated from an outside; and
foam discharged from the foam kit assembly and filled between an inner surface of the battery pack case and the foam kit assembly,
wherein the foam kit assembly comprises:
a support frame extending in the horizontal direction and having at least one opening for allowing liquid foam to pass therethrough in the vertical direction;
a foam kit seated on the support frame to contact a top cover of the battery pack case and be pressed by the top cover and having an accommodation space formed therein for accommodating the liquid foam; and
a pressing needle protruding from the support frame to penetrate the foam kit,
wherein the foam is formed by allowing the liquid foam to flow downward from the accommodation space of the foam kit through a through-hole of the foam kit, which is defined by the pressing needle, to form the foam on a bottom surface of a housing of the battery pack case.

2. The battery pack of claim 1, wherein the foam kit has a top surface brought into contact with the top cover and pressed downward by the top cover and a bottom surface through which the pressing needle is penetrated.

3. The battery pack of claim 2, wherein the battery pack case comprises:
the housing of which an inside is opened upward; and
the top cover mounted to an upper opening of the housing so as to press the foam kit of the foam kit assembly downward.

4. The battery pack of claim 3, wherein the foam is for being solidified by foaming and curing of the liquid foam and uniformly fills a gap between the plurality of battery cells in the vertical direction while surrounding the plurality of battery cells.

5. The battery pack of claim 4, wherein the support frame supports an upper shape of the foam discharged from the through-hole of the foam kit and formed between the plurality of battery cells,
wherein the support frame comprises:
an edge member extending along an inner circumference of the upper opening of the housing; and
a bar member which is disposed inside the edge member so that the foam kit is seated thereon and extends in the horizontal direction to be supported by the edge member and in which the at least one opening is formed in a grid shape.

6. The battery pack of claim 5, wherein the pressing needle protrudes upward from a plurality of positions of a top surface of the bar member,
the bottom surface of the foam kit is penetrated by the pressing needle, and
a gap through which the liquid foam is for flowing downward is formed between a penetrated portion of the foam kit and an outer circumferential surface of the pressing needle.

7. The battery pack of claim 4, wherein the plurality of battery cells are divided into a plurality of groups based on position in the horizontal direction, and
the pressing needle is provided in plurality so that a plurality of pressing needles are aligned to a central position of each of the plurality of groups in the vertical direction and spaced apart from each other in the horizontal direction.

8. The battery pack of claim 4, wherein the foam kit comprises:
a pouch-type vinyl cover; and
at least one storage chamber formed in the pouch-type vinyl cover to accommodate the liquid foam,
wherein the liquid foam is one component type liquid foam.

9. The battery pack of claim 4, wherein the foam kit comprises:
a pouch-type vinyl cover;
a plurality of storage chambers formed in the pouch-type vinyl cover to accommodate the liquid foam; and
a separation membrane disposed in the pouch-type vinyl cover to partition the pouch-type vinyl cover into the plurality of storage chambers and broken by a pressure applied to the pouch-type vinyl cover from the top cover,
wherein the liquid foam is two component type liquid foam, and a base and a curing agent of the two component type liquid foam are accommodated in the plurality of storage chambers, respectively.

10. The battery pack of claim 8, wherein the pouch-type vinyl cover is melted at a temperature of heat generated when the liquid foam is foamed and cured.

11. The battery pack of claim 3, wherein the housing comprises:

a lower plate having an area on which the plurality of battery cells are seated; and an upper frame extending along a circumference of the lower plate and having a height greater than that of each of the plurality of battery cells, wherein the battery pack further comprises at least one pneumatic pressure adjustment hole extending in an inside of the lower plate and an inside of the upper frame and having an inlet formed in a top surface of the lower plate and an outlet formed in an inner circumferential surface or an outer circumferential surface of an upper end of the upper frame.

12. A method for manufacturing a battery pack, comprising:

a battery cell storing process of storing a plurality of battery cells arranged in a horizontal direction and each extending in a vertical direction in a housing of which an inside is opened upward;

a foam kit assembly arrangement process of arranging a foam kit assembly, in which liquid foam is accommodated, on the plurality of battery cells;

a battery pack case assembly process of assembling a battery pack case by mounting a top cover to an upper opening of the housing;

a liquid foam diffusion process of allowing a portion of the foam kit assembly to be penetrated as the foam kit assembly contacts the top cover and is pressed by the top cover and diffusing the liquid foam to an entire inner space of the battery pack case from the foam kit assembly; and a foam formation process of forming foam between an inner surface of the battery pack case and the foam kit assembly by foaming and curing the liquid foam.

13. The method of claim 12, wherein the foam kit assembly arrangement process comprises:

a support frame seat process of seating a support frame of the foam kit assembly on the plurality of battery cells;

a foam kit seat process of seating a foam kit of the foam kit assembly on the support frame; and a pressing needle contact process of allowing the foam kit and a pressing needle of the foam kit assembly, which protrudes from the support frame, to contact each other.

14. The method of claim 13, wherein the liquid foam diffusion process comprises:

a foam kit pressing process of pressing the foam kit downward by the top cover;

a discharge hole forming process of forming a discharge hole by penetrating the pressing needle through a bottom surface of the foam kit; and a liquid foam discharge process of discharging the liquid foam accommodated in the foam kit onto the plurality of battery cells through a gap between the discharge hole and an outer circumferential surface of the pressing needle.

15. The method of claim 14, wherein the liquid foam diffusion process comprises:

a liquid foam spreading process of spreading the liquid foam on the plurality of battery cells in the horizontal direction; and a liquid foam flowing process of inducing a downward flow of the liquid foam from an upper portion to a lower portion of each of the plurality of battery cells.

16. The method of claim 14, wherein the foam formation process comprises:

a liquid foam solidification process of solidifying the liquid foam by foaming and curing the liquid foam; and a foam kit exterior melting process of melting a pouch-type vinyl cover that is an exterior of the foam kit by using heat generated when the liquid foam is foamed and cured.

17. The method of claim 15, wherein the battery cell is a cylindrical secondary battery, and foam formed through the foam formation process uniformly fills a gap between the plurality of battery cells in the vertical direction.

18. The battery pack of claim 9, wherein the pouch-type vinyl cover is melted at a temperature of heat generated when the liquid foam is foamed and cured.

*   *   *   *   *